United States Patent [19]
Maccabee

[11] Patent Number: 5,161,125
[45] Date of Patent: Nov. 3, 1992

[54] RADIATION SELECTIVE SYSTEM FOR TARGET RANGE AND IMAGING READOUT

[75] Inventor: Bruce Maccabee, Sabillasville, Md.

[73] Assignee: The United States of America as represented by the Secretary of the Navy, Washington, D.C.

[21] Appl. No.: 878,597

[22] Filed: May 5, 1992

[51] Int. Cl.$^5$ ............................................. G01S 15/00
[52] U.S. Cl. ........................................ 367/99; 367/7; 367/128; 356/3
[58] Field of Search ....................... 367/99, 7, 11, 128; 342/52; 356/3

[56] References Cited

U.S. PATENT DOCUMENTS 3,978,342 8/1976 Hagen et al. .
4,690,551 9/1987 Edwards et al. .
4,713,798 12/1987 Kay ............................................ 367/7
4,761,072 8/1988 Pryor .

*Primary Examiner*—Daniel T. Pihulic
*Attorney, Agent, or Firm*—Kenneth E. Walden; Jacob Shuster

[57] ABSTRACT

Optical radiation is propagated through an attenuating medium to a target from which it is reflected and picked up by an echo receiver system to provide ranging and imaging data during one mode of operation. The optical radiation is transformed into acoustical pulse energy alternatively radiated to and reflected from the target in another mode of operation. The operational mode is selected so as to optimize the data extracted from the echo receiver system under different conditions affecting receiver reception.

11 Claims, 2 Drawing Sheets

RADIATION SELECTIVE SYSTEM FOR TARGET RANGE AND IMAGING READOUT

BACKGROUND OF THE INVENTION

This invention relates in general to target tracking systems wherein radiation transmitted from a source to the target through a propagation medium is reflected from the target and detected at an echo receiving location to provide target range and imaging information.

The limiting distance for underwater target ranging systems, was heretofore determined from the nature of the target echo, the strength of the target illuminating radiation and the condition of the water as the propagating medium affecting signal backscatter and attenuation. For optical radiation the attenuation is quite large in water by virtue of which acoustic radiation is preferred. On the other hand, image resolution achieved by optical systems is much better than acoustic systems. Hence, an optical system is preferred for short range operation whereas an acoustic system is preferred at times when the turbidity of the water is so great as to render optical radiation useless because of its inability to penetrate the medium a sufficient distance to reach expected targets. It is well known in this regard that acoustic signals of very high frequency (hundreds of kilohertz) are not attenuated in water as rapidly as optical signals and are relatively immune to optical turbidity created by particulate matter in the water. However, acoustic pulse signals at very high frequencies are only useful for ranging and imaging purposes over limited distances and are not as good as optical radiation in regard to image resolution because of longer wavelengths.

The concept of providing dual modes of transmitting target tracking radiation is already known, as disclosed for example in U.S. Pat. No. 3,978,342 to Hagen et al. However, the alternative operational modes disclosed in the Hagen et al. patent involve in common the transmission of optical radiation. The use of acoustical means in connection with the transmission of targeting radiation from an optical source is also known, as disclosed for example In U.S. Pat. No. 4,690,551 to Edwards et al. The acoustic means according to the Edwards et al. patent is however used to modify the radiation transmitted, which remains optical in nature. The use of both optical and acoustical means for target sensing operations in a radiation tracking system is also disclosed in U.S. Pat. No. 4,761,072 to Pryor. Use of the acoustical means is however limited to the data readout phase of operation according to the Pryor patent. It is therefore an important object of the present invention to provide a target tracking system directly benefiting from the different characteristics of optical and acoustical radiation in producing a wider range of useful data obtained by emission of target illuminating radiation and reception of echo radiation reflected from the illuminated target.

SUMMARY OF THE INVENTION

In accordance with the present invention a source of optical radiation, such as a high frequency laser generator emitting a beam of optical energy of short pulse duration, is utilized for target illumination purposes. Through a beam forming lens arrangement, the illuminating beam can be sharply focussed at the location of a small focal volume to create an acoustic pulse or shock wave due to dielectric breakdown of particles or the fluid within an enclosure isolated from the radiation propagating medium within which a target is located. The target can be directly illuminated by the optical radiation from the aforementioned source in one operational mode of a target tracking system. Under selective data optimizing control, the system is switched to another mode in which an acoustic pulse is generated as aforementioned and radiated through the propagating medium toward the target. Separate optical and acoustic receivers respectively pick up optical and acoustic echo radiation reflected from the target to provide signals from which optimized range and imaging data is extracted for enhanced readout purposes.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF PREFERRED EMBODIMENT

Figure 1:
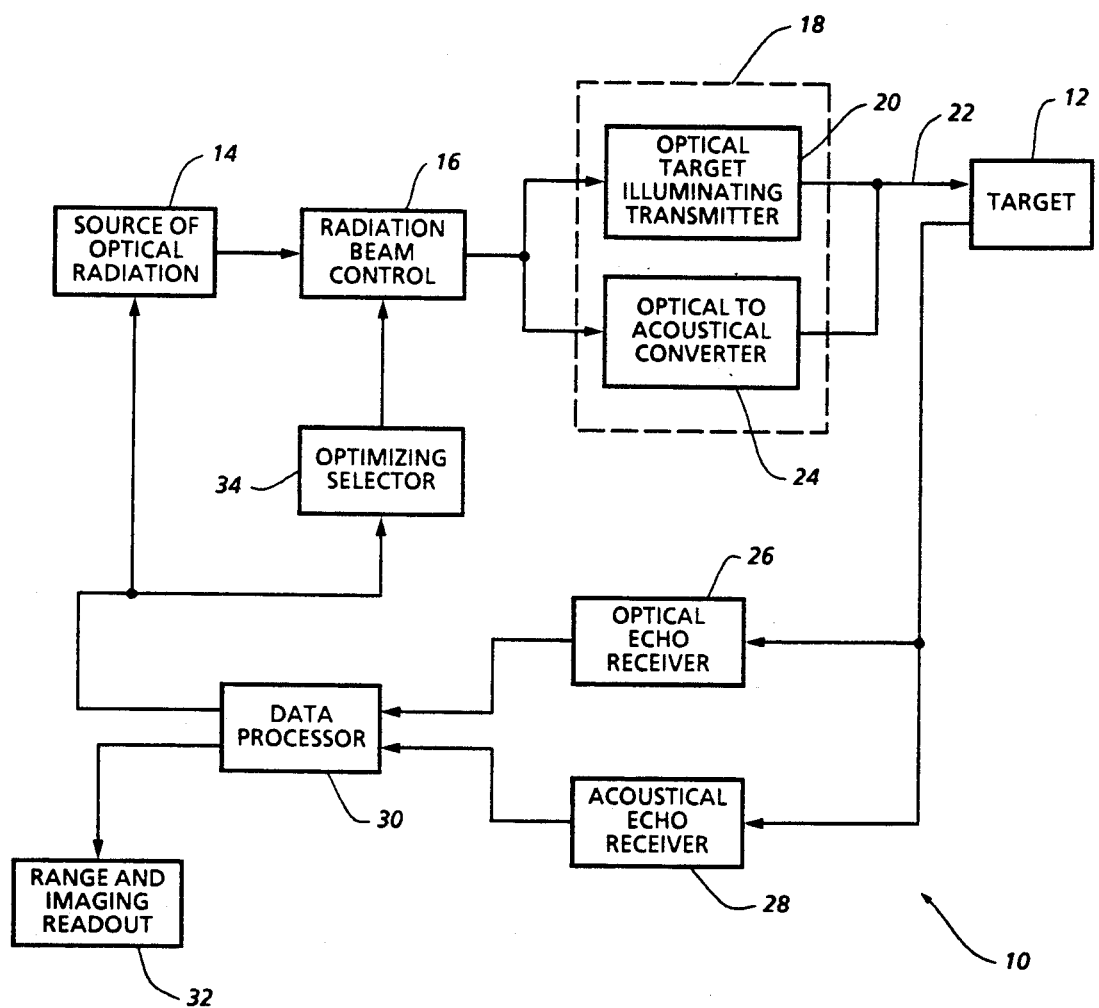
FIG. 1 is a schematic block diagram illustrating a target system in accordance with the present invention.

Referring now to the drawing in detail, FIG. 1 diagrams a system generally referred to by reference numeral 10 for obtaining range and imaging data on a target 12 by impingement thereon of radiation which is reflected as echoes. The radiation in the form of optical pulse energy of high intensity and rapid modulation originates from a source 14, such as a laser beam generator. The optical radiation from source 14 is transmitted through radiation beam controlling optics 16 of the system, in accordance with the present invention as diagrammed in FIG. 1, from which the radiation passes through enclosure 18 before being propagated through an attenuating propagation medium, such as seawater, to the target 12. Within enclosure 18, a beam of the radiation is either directed by transmitter 20 in its original optical energy form along a predetermined path 22 through the propagation medium, or alternatively transformed by converter 24 into acoustical energy by use of the generally known phenomenon of laser created underwater sound. Such sound energy is radiated generally along the same path 22 to the target 12. The optical echo radiation reflected from the target 12 is picked up by an optical echo receiver 26 while acoustic echo radiation is picked up by a separate acoustical echo receiver 28. Signal outputs from the receivers 26 and 28 are fed to a data processor 30 of a generally known type utilized to extract range and imaging data from echo radiation signals. Such data is ultimately fed to a readout component 32 of the system as diagrammed.

In accordance with the present invention, the data processor 30 is programmed to supply data optimizing outputs to the optical radiation source 14 and an optimizing selector 34 through which the radiation beam control 16 selectively enables the converter 24 for transformation of optical radiation energy into acoustical energy within enclosure 18 as aforementioned. Thus, changes in propagational conditions of the attenuating medium and other related environmental factors are operative through information stored in the data processor 30 and by programming thereof to operate the selector 34 so as to optimize data readout through component 32.

Figure 2:
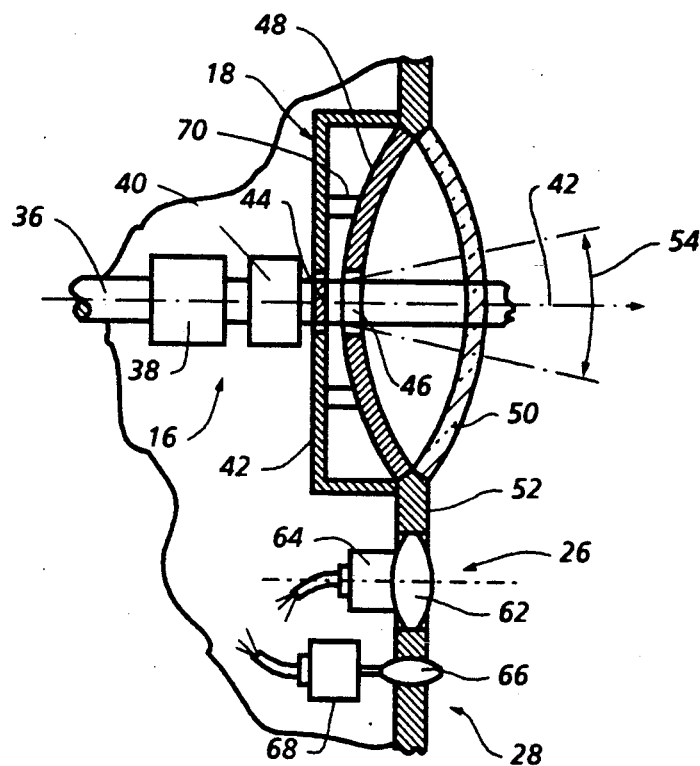
FIG. 2 is a partial simplified side section view through radiation transmitting and receiving equipment carried by an underwater vehicle in accordance with one embodiment of the invention, in an optical radiation mode.

In accordance with one embodiment of the invention as illustrated in FIG. 2, the aforementioned source of optical radiation 14 creates a beam of optical radiation 36 that passes through beam steering optics 38 of the aforementioned radiation beam control 16 diagrammed in FIG. 1. The beam of radiation may thereby be directionally varied within limits as a scanning function of system operation for target searching and imaging purposes. The radiation emerging from optics 38 passes through beam forming optics 40 so as to selectively control divergence or convergence of the radiation beam relative to its optical axis 42 or collimation thereof parallel to axis 42 as is necessary to either illuminate the target 12 with either optical radiation or acoustical energy generated within enclosure 18 as will be explained hereinafter.

In the optical radiation mode shown in FIG. 2, the radiation 36 emerges from optics 40 and passes into enclosure 18 through a transparent window 44 in its opaque wall 42. The window 44 is in axial alignment with an opening 46 in an acoustic collimating reflector or mirror 48 of spherical or paraboloidal shape forming part of the converter 24 diagrammed in FIG. 1. The enclosure 18 internally seals a suitable body of fluid having dielectric particles therein, isolated from the propagating medium by an outer transparent wall 50, made of glass for example, through which the optical radiation is transmitted. The enclosure 18 is thus formed between walls 42 and 50 to also form the transmitter 20 diagrammed in FIG. 1. The wall 50 is adapted to be mounted in a bulkhead 52 of an underwater vehicle according to the embodiment shown in FIG. 2. The optical radiation 36 emerging from transparent wall 50 will accordingly be propagated through the seawater and may be directionally varied by means of the aforementioned steering optics 38 so as to cover a limited scanning angle 54 in order to impinge upon the target being searched.

Figure 3:
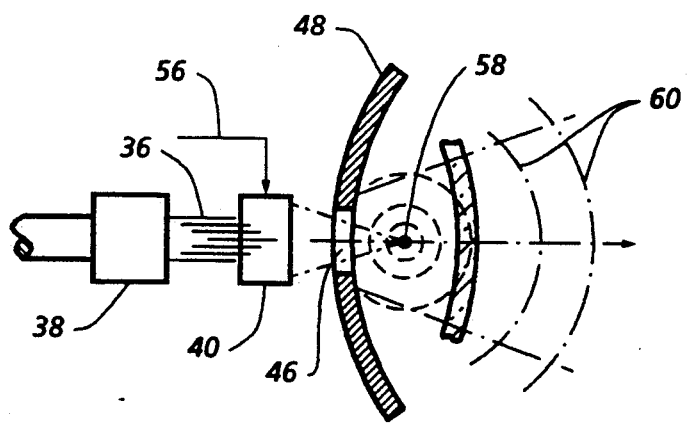
FIG. 3 is a simplified side section view of a portion of the equipment shown in FIG. 2, in an acoustic radiation mode.

In the acoustic mode of the system shown in FIG. 3 the optical radiation 36, in response to a signal output 56 from selector 34 applied to the beam forming optics 40, is adjusted for convergence and focussing thereof at a focal point 58 within the enclosure 18 located forwardly of and adjacent to the acoustical reflector 48. An acoustical energy pulse is thereby created at the focal point and a portion of such acoustical energy is captured by reflector 48 to be directed forwardly along optical axis 42 as an acoustic wave indicated by the curved wavefronts 60 in FIG. 3. The divergence of such acoustic wave as it approaches the target is determined by the effective frequencies of the acoustic pulse generated at focal point 58 and the size of the reflector 48 in accordance with known principles of radiation energy physics.

With reference once again to FIG. 2, the portion of the optical radiation energy impinging the target in the optical radiation mode is reflected and travels back to the bulkhead 52 of the submerged vehicle so as to be picked up by an optical light collection lens device 62 with which an optical detector 64 is associated to form the optical echo receiver diagrammed in FIG. 1. The electrical signal output from detector 64 is fed to the data processor 30 for extraction of the target range and imaging data. Generally, such data extraction process involves measuring the time it takes for a transmitted radiation pulse to be reflected from a target 12 and return to receiver 26. Range gating techniques as known in the art may be utilized to reduce backscatter resulting from particulate matter in the sea water propagation medium. Target imaging data, on the other hand, may be extracted by use of known techniques to produce for example TV-like picture readout including range-gated readouts creating three dimensional images.

If the turbidity condition of the sea water medium becomes excessive so as to render the optical data readout useless for ranging and imaging purposes, the system is switched to the acoustical radiation mode as hereinbefore described with respect to FIG. 3. An acoustic radiation wave indicated by wavefront 60 when reaching the target will be partially reflected back and picked up by a hydrophone device 66 connected to device 68 as shown in FIG. 2 forming the acoustical echo receiver 28 as diagrammed in FIG. 1. The acoustic signal received by hydrophone 66 is processed by the amplifier and filter device 68 of receiver 28 before being fed to the data processor 30 for target range calculation similar to the calculation process hereinbefore described with respect to optical echo radiation.

Scanning movement of the acoustic radiation emitted over the target area may be performed while measuring the strengths and arrival times of resulting acoustical echoes picked up by receiver 28. Such scanning action may be accomplished by changing the position of the focal point 58 within the enclosure 18 or by variably rotating the reflector 48 through adjustment of mounting supports 70 schematically indicated in FIG. 2. A typical raster scan rate could thereby be used to maximize the image data rate making it possible to determine direction and distance of portions of targets larger than the size of the illuminating beam.

The dual mode system hereinbefore described in connection with water as the radiation attenuating propagation medium, is also applicable to other propagation media such as air for airborne ranging and imaging purposes at short ranges, in a fog for example. Further, the echo receivers may be carried by submerged vehicles separate from the vehicle carrying the optical source of radiation and associated radiation emitting equipment. Alternatively, the hydrophone receiver 62 could be mounted in the area of acoustic reflector 48 to take advantage of system gain afforded by use of reflector 48 as an acoustic antenna.

Numerous other modifications and variations of the present invention are possible in light of the foregoing teachings. It is therefore to be understood that within the scope of the appended claims the invention may be practiced otherwise than as specifically described.

What is claimed is:

1. In combination with a source of optical radiation and means for converting the optical radiation into acoustical radiation, a system for obtaining tracking data with respect to a target to which the radiation is propagated through an attenuating medium, comprising: radiation control means operatively associated with said source for alternative transmission of the optical radiation and the acoustical radiation to said target through the attenuating medium, echo receiver means for reception of transmitted optical and acoustical radiation reflected from the target, data processing means operatively connected to the echo receiver means for extracting the target tracking data from said reception of the radiation by the echo receiver means and data optimizing means operatively connected to the data processing means and the radiation control means for selection of the optical or acoustical radiation alternatively transmitted to the target.

2. The combination of claim 1 wherein said echo receiver means includes a light collection lens through which the optical radiation reflected from the target is received and a hydrophone device receiving the reflected acoustical radiation.

3. The combination of claim 2 wherein said radiation control means includes optic steering means directing a beam of the optical radiation from the source along an optical axis toward the target for illumination thereof and beam forming means through which the beam of the optical radiation is projected from the optic steering means for controlling collimation and convergence of the beam in response to selective signaling from the data optimizing means.

4. The combination of claim 3 wherein said means for converting the optical radiation includes an enclosure, an acoustic collimating reflector within said enclosure having an opening through which the beam of the optical radiation is directed by the optic steering means and transparent wall means in the enclosure through which the optical radiation is transmitted while internally isolating said enclosure from the attenuating medium for establishing a focal point location within the enclosure at which the acoustical radiation is generated by focussing of the beam of the optical radiation and reflection thereof from the acoustic collimating reflector toward the target.

5. The combination of claim 1 wherein said radiation control means includes optic steering means directing a beam of the optical radiation from the source along an optical axis toward the target for illumination thereof and beam forming means, through which the beam of the optical radiation is projected from the optic steering means for controlling collimation and convergence of the beam in response to selective signaling from the data optimizing means.

6. The combination of claim 1 wherein said means for converting the optical radiation includes an enclosure, an acoustic collimating reflector within said enclosure having an opening through which the optical radiation is directed by the optic steering means and transparent wall means in the enclosure through which the optical radiation is transmitted for internally isolating said enclosure from the attenuating medium and establishing a focal point location within the enclosure at which the acoustical radiation is generated by focussing of the optical radiation, said acoustical radiation being reflected from the acoustic collimating reflector toward the target.

7. In combination with a source of optical radiation energy, a system for obtaining data with respect to a target to which said radiation energy is propagated through an attenuating medium, including echo receiver means for reception of the radiation energy impinging on and reflected from the target, the improvement residing in: converter means operatively positioned between the source and the target for transforming the optical radiation energy into acoustical energy radiated toward the target to be reflected therefrom toward the receiver means and selector means operatively connected to the converter means for selectively enabling the same to optimize data extracted from the receiver means.

8. The combination of claim 7 wherein said converter means includes an enclosure, an acoustic collimating reflector within said enclosure and transparent wall means through which the optical radiation is transmitted for internally isolating said enclosure from the attenuating medium establishing a focal point location within the enclosure at which the acoustical energy is generated by focussing of said optical radiation energy, the acoustical energy being reflected from the acoustic collimating reflector toward the target.

9. The combination of claim 8 wherein said echo receiver means comprises separate collection lens and hydrophone devices respectively receiving the optical radiation and the acoustical energy reflected from the target.

10. In combination with a system for obtaining range and imaging data with respect to a target by reception of echo radiation reflected in response to impingement on the target of optical radiation propagated along a predetermined path through an attenuating medium from an optical source, a method of optimizing said data, including the steps of: isolating a conversion zone from the attenuating medium between said source and the target; transmitting the radiation from said source to the target through said conversion zone; selectively transforming the optical radiation from said optical source within said conversion zone into acoustical energy; and alternatively radiating the acoustical energy to the target along said predetermined path in accordance with changes in propagational conditions of the attenuating medium.

11. The method of claim 10 wherein the attenuating medium is water.

* * * * *